United States Patent
Wang

(10) Patent No.: US 7,304,702 B2
(45) Date of Patent: Dec. 4, 2007

(54) LIQUID CRYSTAL DISPLAY WITH MIRROR FACE FUNCTION

(75) Inventor: Po Hsien Wang, Taichung (TW)

(73) Assignee: Wintek Corporation, Taichung (TW)

( * ) Notice: Subject to any disclaimer, the term of this patent is extended or adjusted under 35 U.S.C. 154(b) by 449 days.

(21) Appl. No.: 11/028,001

(22) Filed: Jan. 4, 2005

(65) Prior Publication Data
US 2005/0116923 A1    Jun. 2, 2005

Related U.S. Application Data

(63) Continuation-in-part of application No. 10/449,005, filed on Jun. 2, 2003, now abandoned.

(51) Int. Cl.
*G02F 1/1335*    (2006.01)
*G02F 1/1333*    (2006.01)

(52) U.S. Cl. .......... 349/114; 349/110; 349/61; 349/62; 349/95; 349/96; 359/618; 359/619; 359/620

(58) Field of Classification Search ............ 349/61, 349/62, 95, 96, 110, 114; 359/618–620
See application file for complete search history.

(56) References Cited

U.S. PATENT DOCUMENTS

| | | | | |
|---|---|---|---|---|
| 6,633,351 | B2 * | 10/2003 | Hira et al. | 349/95 |
| 6,876,408 | B2 * | 4/2005 | Yamaguchi | 349/57 |
| 2002/0130985 | A1 * | 9/2002 | Weindorf et al. | 349/61 |
| 2003/0043315 | A1 * | 3/2003 | Umemoto et al. | 349/65 |

* cited by examiner

*Primary Examiner*—Huyen Ngo
(74) *Attorney, Agent, or Firm*—Rosenberg, Klein & Lee

(57) ABSTRACT

A liquid crystal display with mirror face function, including a liquid crystal display module and a reflective element. A lower polarizing plate and an upper polarizing plate are respectively disposed on two faces of the liquid crystal display module. The reflective element is disposed on one face of the upper polarizing plate distal from the backlight element, whereby the reflective element can reflect part of external light to achieve a mirror-face effect. When the liquid crystal display module display a picture, the light emitted from the liquid crystal display module can pass through the reflective element to enhance the transparence.

5 Claims, 6 Drawing Sheets

LIQUID CRYSTAL DISPLAY WITH MIRROR FACE FUNCTION

REFERENCE TO RELATED APPLICATIONS

This Application is a Continuation-in-Part of patent application Ser. No. 10/449,005 filed 2 Jun. 2003, now abandoned.

BACKGROUND OF THE INVENTION

The present invention is related to a liquid crystal display with mirror face function, and more particularly to a mirror-face liquid crystal display with better optical efficiency.

Some liquid crystal displays need to have mirror face function due to special requirement. FIG. 8 shows an in-car rearview mirror capable of showing information. A transflective film 82 is disposed on one face of the lens 81 of the rearview mirror. A light-emitting display 83 is disposed on rear side of the lens 81. In normal state, the lens 81 can reflect external light to serve as a mirror. When the display 83 emits light, the light partially penetrates through the transflective film 82 to achieve display effect.

The conventional liquid crystal light-emitting display 83 includes a liquid crystal display module 831 and a backlight module 832. When the display 83 emits light, the backlight module 832 serves as the light source. Due to the working characteristic of the liquid crystal display module 831, only about one half of the emitted light can pass through the liquid crystal display module 831. The transflective film 82 will absorb a part of the light beam. Therefore, only about one half of the light beam passing through the liquid crystal display module 831 can pass through the transflective film 82. In other words, only about 25% of the light emitted by the backlight module 832 can pass through the transflective film 82 as shown in FIG. 9. Therefore, the aforesaid in-car rearview mirror capable of showing information has poor optical efficiency. As a result, a high brightness backlight module 832 is necessary for enhancing the brightness. This greatly increases power consumption. In the case that such display is applied to a portable implement such as a mobile phone, PDA and notebook-type computer, the great power consumption will shorten the using time. Moreover, the high brightness backlight module 832 will lead to the problem of overheating.

Another type of liquid crystal display is additionally equipped with a switch-type display such as twisted nematic liquid crystal display (TN-LCD). The turning on/off of the switch-type display is controlled by means of a circuit. When the switch-type display works, the external light is reflected to achieve a mirror face effect. When the switch-type display is turned off, the light emitted by the internal liquid crystal display module can pass through the switch-type display to serve as a display panel. Such display is thicker and has complicated structure. In addition, such display is manufactured at higher cost. Therefore, such display fails to meet the requirements for lightweight, thinness and low power consumption.

Therefore, it is necessary to provide a liquid crystal display which meets the requirements for lightweight, thinness and low power consumption and is applicable to portable implement.

SUMMARY OF THE INVENTION

It is therefore a primary object of the present invention to provide a liquid crystal display with mirror face function. When the liquid crystal display module displays a picture, the transparency is enhanced.

According to the above object, the liquid crystal display with mirror face function of the present invention includes a liquid crystal display module and a brightness enhancement film. A lower polarizing plate and an upper polarizing plate are respectively disposed on two faces of the liquid crystal display module. A backlight element is disposed on one face of the lower polarizing plate distal from the liquid crystal display module to serve as a light source of the liquid crystal display module. The brightness enhancement film is disposed on one face of the upper polarizing plate distal from the backlight element. The alignment direction of the brightness enhancement film is identical to the alignment direction of the upper polarizing plate. The brightness enhancement film can reflect part of external light to form a mirror face. When the liquid crystal display module display a picture, the light emitted from the liquid crystal display module can easily pass through the brightness enhancement film so as to enhance the transparence of the liquid crystal display.

Still according to the above object, the liquid crystal display with mirror face function of the present invention includes a transparent substrate disposed on one face of the upper polarizing plate of the liquid crystal display module distal from the backlight element. A perforated reflective film is disposed on one face of the transparent substrate distal from the liquid crystal display module. The perforated reflective film is formed with multiple perforations respectively corresponding to the pixels of the liquid crystal display module. When the liquid crystal display module displays a picture, the light beams of the pixels can pass through the perforations to enhance the transparence of the liquid crystal display.

The present invention can be best understood through the following description and accompanying drawings wherein:

DETAILED DESCRIPTION OF THE PREFERRED EMBODIMENTS

Figure 1:
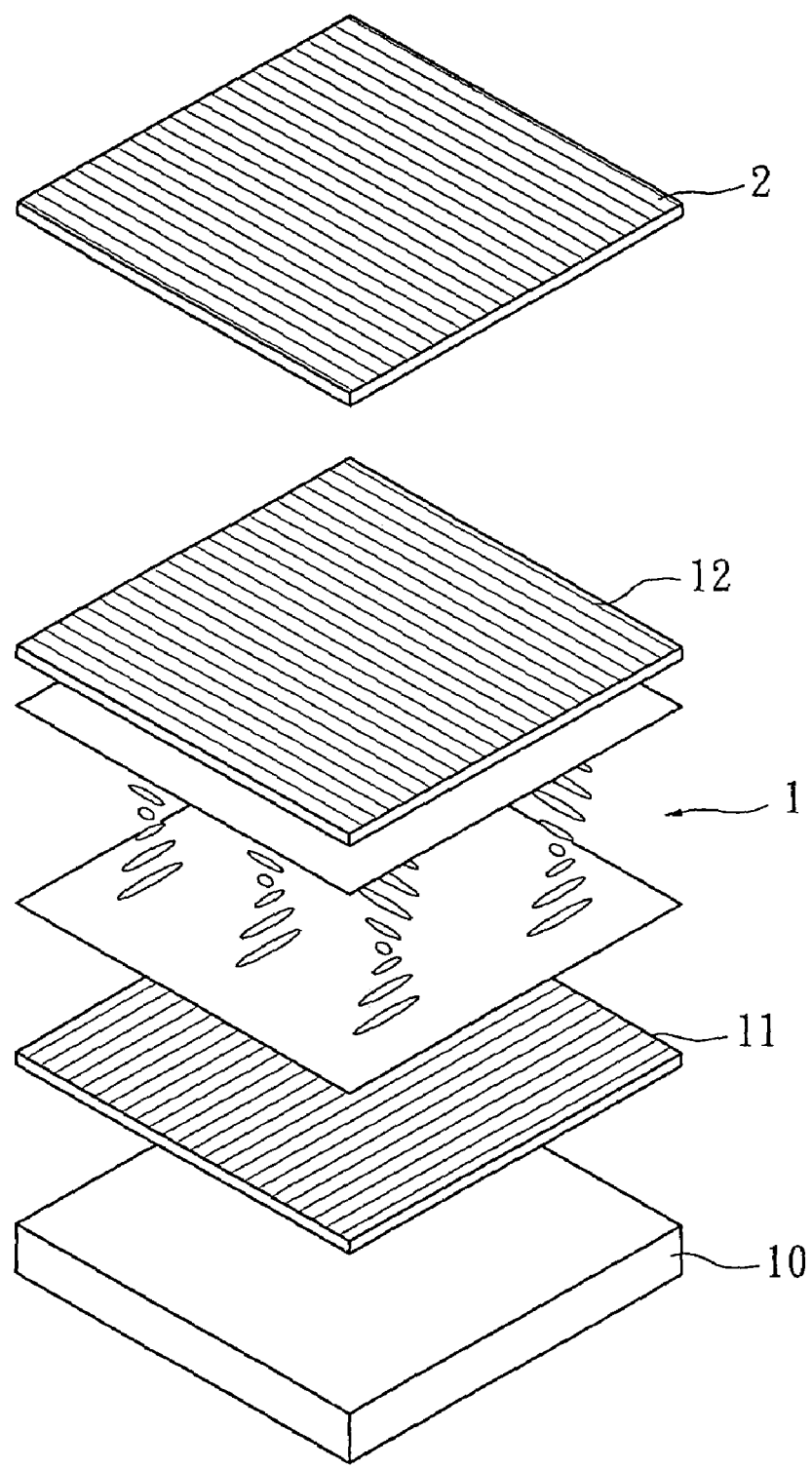
FIG. 1 is a view showing the structure of a first embodiment of the present invention.
Figure 2:
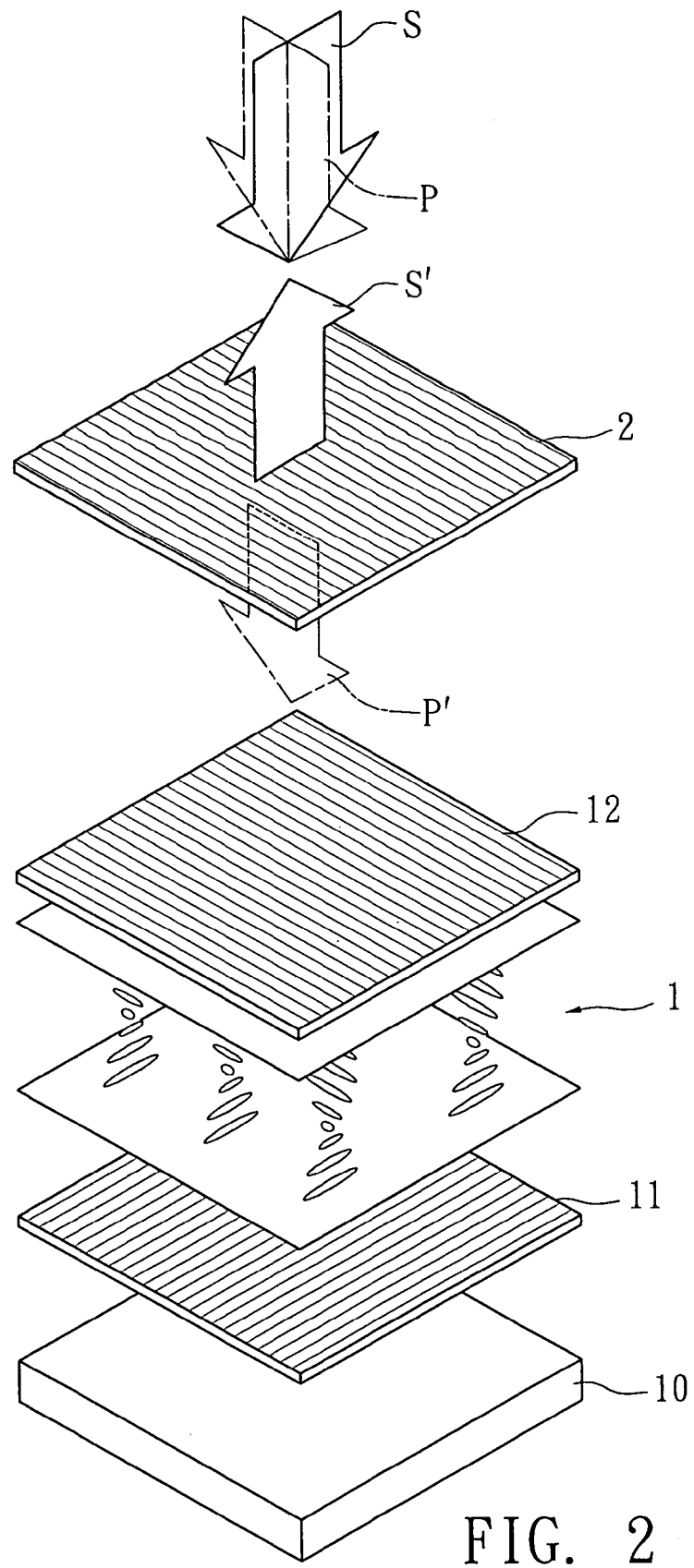
FIG. 2 shows that the first embodiment of the present invention achieves a mirror face effect under external light.
Figure 3:
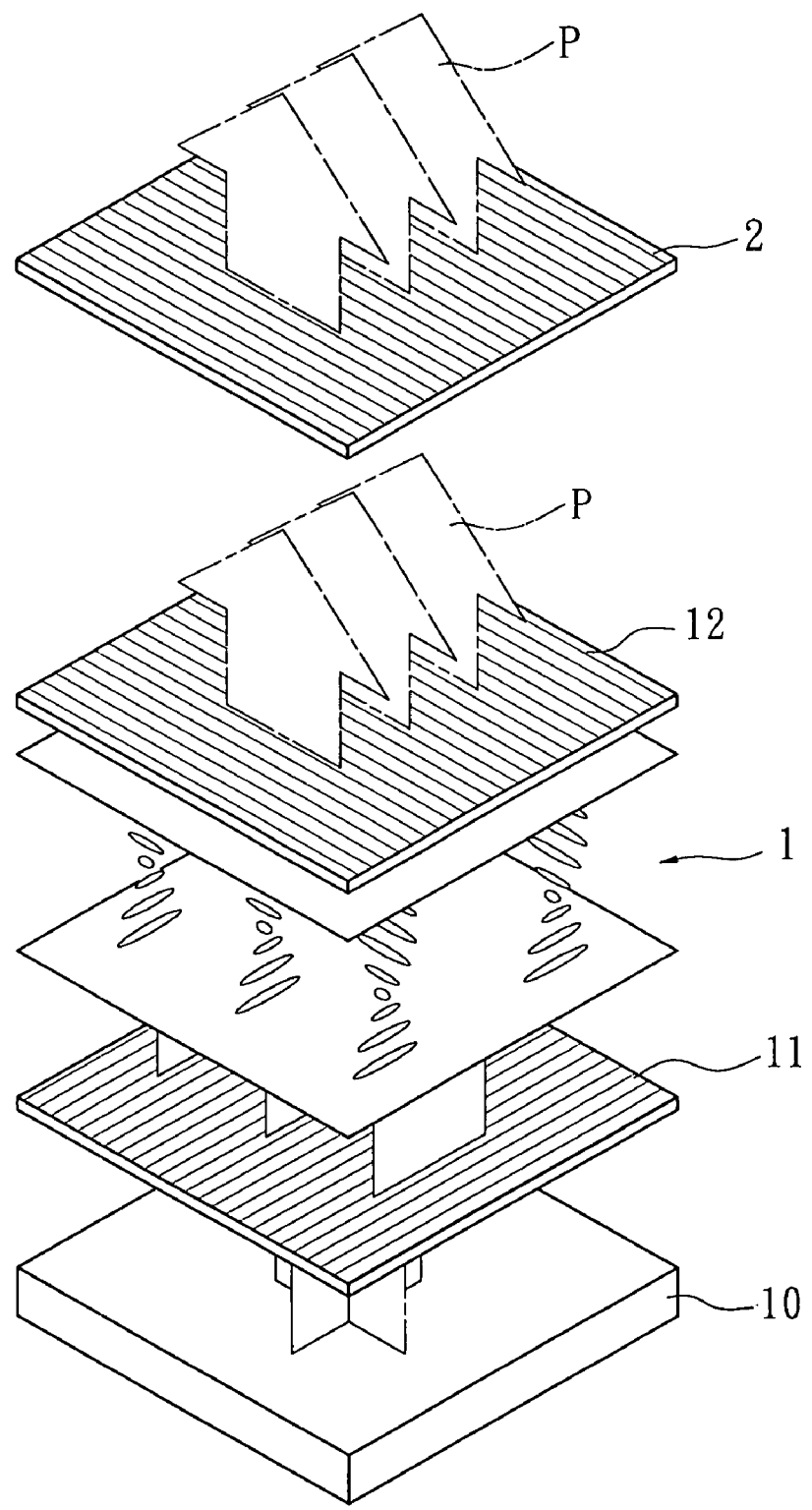
FIG. 3 is a view according to FIG. 2, showing that when the liquid crystal display module display a picture, the light emitted from the liquid crystal display module passes through the dual brightness enhancement film.

Please refer to FIGS. 1 to 3. The liquid crystal display with mirror face function of the present invention includes a liquid crystal display module 1 and a brightness enhancement film 2. A lower polarizing plate 11 and an upper polarizing plate 12 are respectively disposed on two faces of the liquid crystal display module 1. A backlight element 10 is disposed on one face of the lower polarizing plate 11 distal from the liquid crystal display module 1 to serve as the light source of the liquid crystal display module 1. The brightness enhancement film 2 is disposed on one face of the upper polarizing plate 12 distal from the backlight element 10. The alignment direction of the brightness enhancement film 2 is identical to the alignment direction of the upper polarizing plate 12. Therefore, the light emitted from the liquid crystal display module 1 can easily pass through the brightness enhancement film 2.

The brightness enhancement film 2 used in the present invention is dual brightness enhancement film (DBEF) which is a product of 3M (An American company). The DBEF has multiple film structure, therefore the light beam in a direction is permitted to pass through the DBEF, while the light beam in normal direction is reflected. This is a characteristic of the DBEF. The DBEF is applied to the present invention to achieve the necessary mirror face effect by means of the above characteristic.

Referring to FIG. 2, when the liquid crystal display module 1 does not work, the backlight element 10 will not emit light. The external light generally includes light beams the axes of which are perpendicular to each other. The two kinds of light beams are referred to as P light and S light hereinafter. When the external light is projected onto the DBEF, the light beam (S light) of the external light in the direction normal to the alignment direction of the DBEF is reflected, whereby the surface of the DBEF presents a mirror state.

When the liquid crystal display module 1 displays a picture, the light emitted by the backlight element 10 will pass through the lower polarizing plate 11. After twisted by the liquid crystal molecules in the liquid crystal display module 1, only P light passes through the upper polarizing plate 12. The alignment direction of the DBEF is identical to the alignment direction of the upper polarizing plate 12 so that the P light passing through the liquid crystal display module 1 can easily pass through the DBEF as shown in FIG. 3. Accordingly, the transparence is enhanced.

In actual test of the liquid crystal display with mirror face function of the present invention, with ordinary arrangement, when the liquid crystal display module 1 works, the brightness is up to 120 cd/m$^2$. Therefore, a good display effect can be achieved without using the high brightness backlight module with higher power as in the prior art.

In conclusion, the alignment direction of the DBEF of the present invention is identical to the alignment direction of the upper polarizing plate 12 of the liquid crystal display module 1. Therefore, the light emitted by the liquid crystal display module 1 can easily pass through the DBEF and thus the transparence is enhanced when the liquid crystal display module 1 displays a picture. The light beam of the external light in the direction normal to the alignment direction of the DBEF is reflected by the DBEF to achieve a mirror face effect. Therefore, in preconditions of lightweight, thinness and low power consumption, the optical efficiency can be enhanced.

Figure 4:
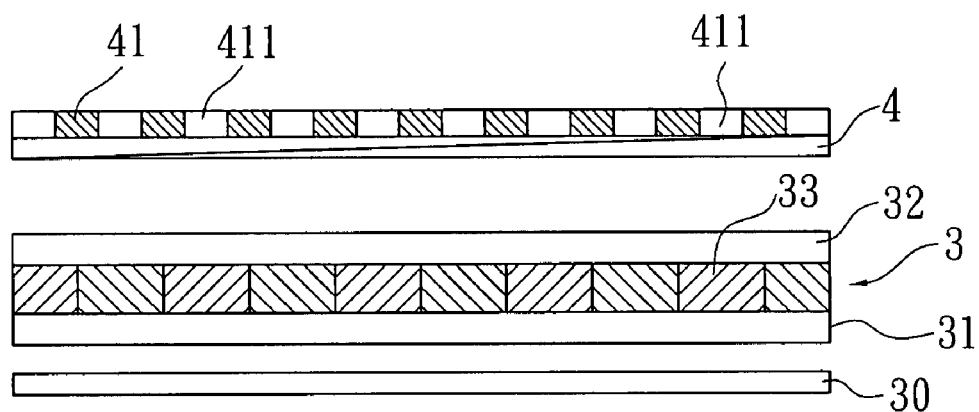
FIG. 4 is a view showing the structure of a second embodiment of the present invention.
Figure 5:
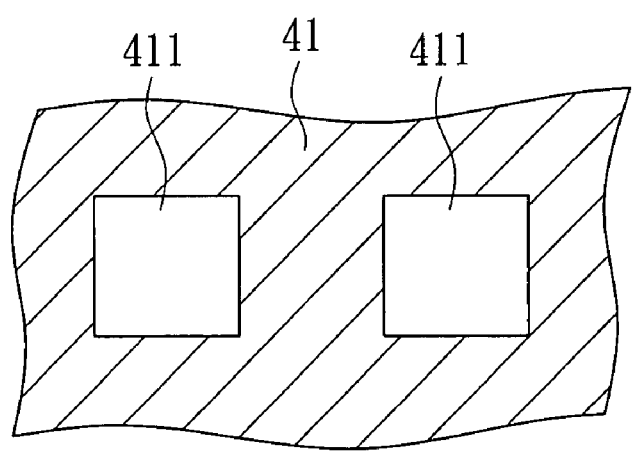
FIG. 5 is a top view of a part of the perforated reflective film of the second embodiment of the present invention.

FIGS. 4 and 5 show a second embodiment of the present invention, in which a transparent substrate 4 is disposed on one face of the upper polarizing plate 32 of the liquid crystal display module 3 distal from the backlight element 30. A perforated reflective film 41 is disposed on one face of the transparent substrate 4 distal from the liquid crystal display module 3. The perforated reflective film 41 is formed with multiple perforations 411 respectively corresponding to the pixels 33 of the liquid crystal display module 3. When the liquid crystal display module 3 displays a picture, the light beams of the pixels 33 pass through the perforations 411.

Figure 6:
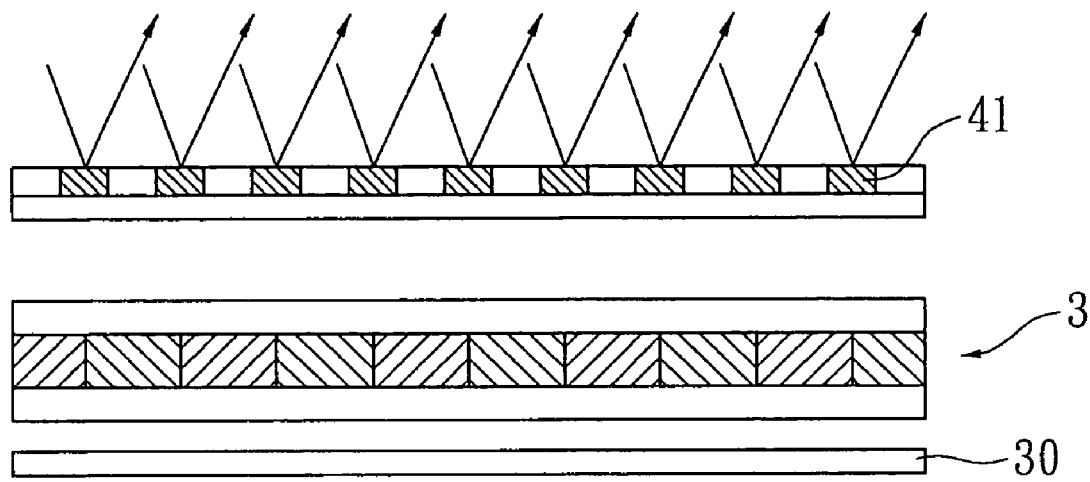
FIG. 6 shows that the second embodiment of the present invention achieves a mirror face effect under external light.
Figure 7:
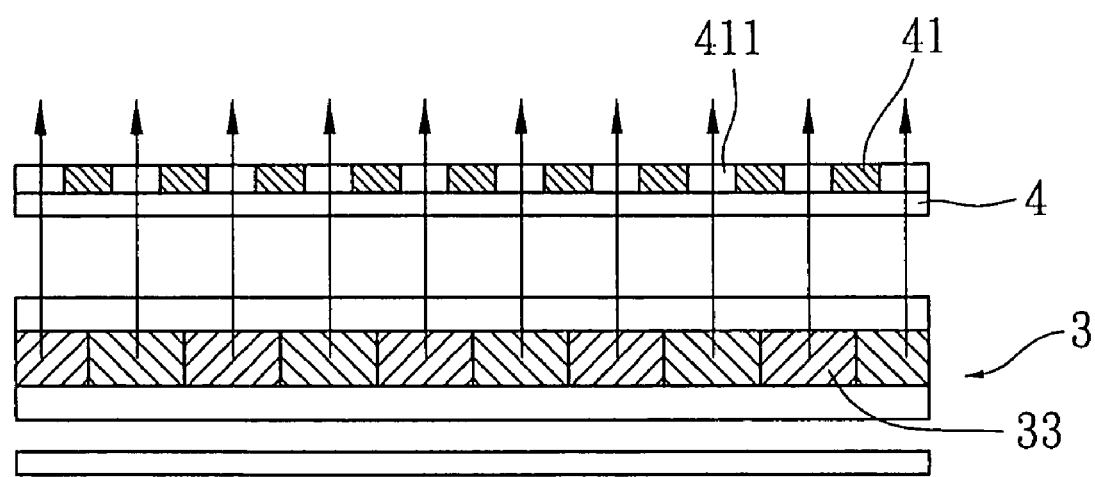
FIG. 7 is a view according to FIG. 6, showing that when the liquid crystal display module display a picture, the light emitted from the liquid crystal display module passes through the dual brightness enhancement film.
Figure 8:
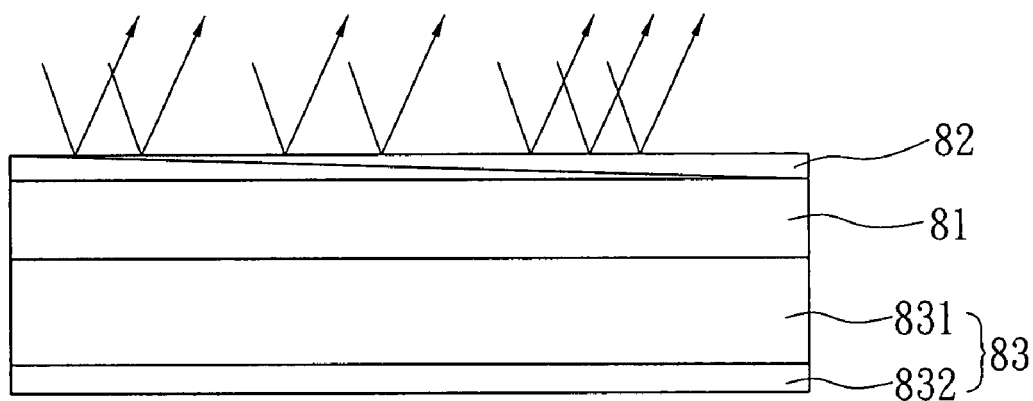
FIG. 8 is a view showing the structure of a conventional in-car rearview mirror capable of showing information.
Figure 9:
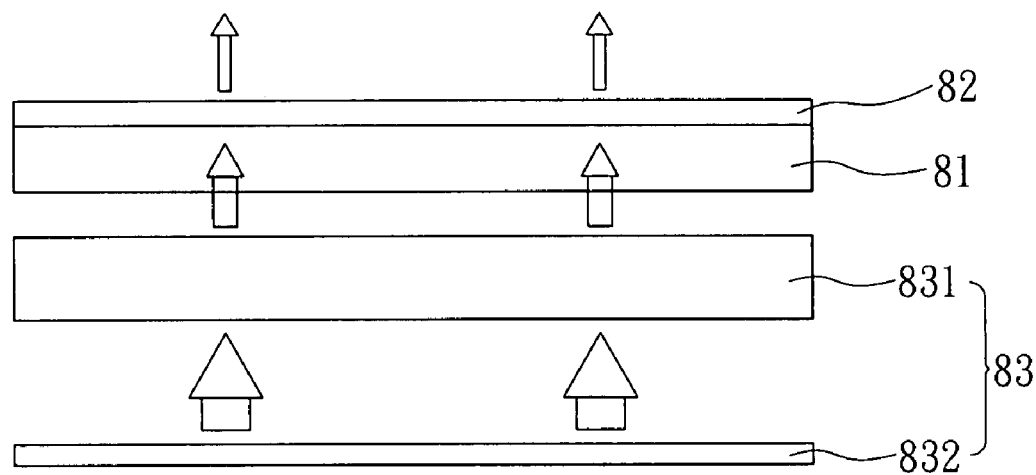
FIG. 9 shows the using state of the conventional in-car rearview mirror capable of showing information.

Referring to FIG. 6, when the liquid crystal display module 3 does not work, the lighting cell 30 will not emit light. At this time, when external light is projected onto the perforated reflective film 41, the external light will be reflected to present a mirror state. When the liquid crystal display module 3 displays a picture, the light passing through the pixels 33 of the liquid crystal display module 3 can pass through the perforations 411 of the perforated reflective film 41 as shown in FIG. 7. Accordingly, the transparence is enhanced to achieve the same effect as the first embodiment.

The above embodiments are only used to illustrate the present invention, not intended to limit the scope thereof. Many modifications of the above embodiments can be made without departing from the spirit of the present invention.

What is claimed is:

1. A liquid crystal display with mirror face function, comprising a liquid crystal display module and a reflective element, a lower polarizing plate and an upper polarizing plate being respectively disposed on two faces of the liquid crystal display module, a backlight element being disposed on one face of the lower polarizing plate distal from the liquid crystal display module to serve as a light source of the liquid crystal display module, the reflective element being disposed on one face of the upper polarizing plate distal from the backlight element, whereby the reflective element can reflect part of external light to form a mirror face and when the liquid crystal display module display a picture, the light emitted from the liquid crystal display module can pass through the reflective element.

2. The liquid crystal display with mirror face function as claimed in claim 1, wherein the reflective element is a brightness enhancement film, the alignment direction of the brightness enhancement film being identical to the alignment direction of the upper polarizing plate, whereby when the liquid crystal display module display a picture, the light emitted from the liquid crystal display module can pass through the brightness enhancement film.

3. The liquid crystal display with mirror face function as claimed in claim 1, wherein the reflective element is a perforated reflective film, the perforated reflective film being formed with multiple perforations respectively corresponding to the pixels of the liquid crystal display module, whereby when the liquid crystal display module displays a picture, the light beam of the pixels can directly pass through the perforations.

4. The liquid crystal display with mirror face function as claimed in claim 2, wherein the brightness enhancement film is a dual brightness enhancement film (DBEF).

5. The liquid crystal display with mirror face function as claimed in claim 1, wherein a transparent substrate is disposed on one face of the perforated reflective film proximal to the liquid crystal display module.

* * * * *